(12) United States Patent
Sohn et al.

(10) Patent No.: US 10,569,243 B2
(45) Date of Patent: *Feb. 25, 2020

(54) DISPERSING AGENT, ITS PREPARATION METHOD AND DISPERSED COMPOSITION OF CARBON-BASED MATERIAL COMPRISING THE SAME

(71) Applicant: LG Chem, Ltd., Seoul (KR)

(72) Inventors: Kwon Nam Sohn, Daejeon (KR); Won Jong Kwon, Daejeon (KR); Kil Sun Lee, Daejeon (KR); In Young Kim, Daejeon (KR); Yeu Young Youn, Daejeon (KR); Hee Yong Park, Daejeon (KR)

(73) Assignee: LG Chem, Ltd. (KR)

( * ) Notice: Subject to any disclaimer, the term of this patent is extended or adjusted under 35 U.S.C. 154(b) by 381 days.

This patent is subject to a terminal disclaimer.

(21) Appl. No.: 14/903,121

(22) PCT Filed: Jul. 31, 2014

(86) PCT No.: PCT/KR2014/007064
§ 371 (c)(1),
(2) Date: Jan. 6, 2016

(87) PCT Pub. No.: WO2015/016639
PCT Pub. Date: Feb. 5, 2015

(65) Prior Publication Data
US 2017/0001161 A1 Jan. 5, 2017

(30) Foreign Application Priority Data

Aug. 1, 2013 (KR) .................. 10-2013-0091625
Jul. 31, 2014 (KR) .................. 10-2014-0098033

(51) Int. Cl.
*C08K 3/04* (2006.01)
*B01F 17/00* (2006.01)
(Continued)

(52) U.S. Cl.
CPC ...... B01F 17/0021 (2013.01); B01F 17/0028 (2013.01); C01B 32/152 (2017.08);
(Continued)

(58) Field of Classification Search
CPC .... B01F 17/0021; B01F 17/0028; C09C 1/48; C01B 31/0484; C01B 31/04;
(Continued)

(56) References Cited

U.S. PATENT DOCUMENTS 4,332,695 A 6/1982 Schulz et al.
4,339,346 A 7/1982 Schulz et al.
(Continued)

FOREIGN PATENT DOCUMENTS

CN 86104549 A 2/1987
CN 101213271 A 7/2008
(Continued)

OTHER PUBLICATIONS

Burgess et al., Structural Identification of the Monomeric Constituents of Petroleum Pitch, Energy Fuels 2010, 24, 4301-4311 (Published on Web Jul. 13, 2010).*
(Continued)

*Primary Examiner* — Michael A Salvitti
(74) *Attorney, Agent, or Firm* — Lerner, David, Littenberg, Krumholz & Mentlik, LLP

(57) ABSTRACT

The present invention relates to a novel dispersing agent capable of uniformly dispersing a variety of carbon-based materials in different media including aqueous solvents and a preparation method thereof, and a carbon-based material-dispersed composition including the same. The dispersing
(Continued)

agent is a mixture of a plurality of polyaromatic hydrocarbon oxides, and the mixture includes polyaromatic hydrocarbon oxide having a molecular weight of 300 to 1000 in an amount of 60% by weight or more.

8 Claims, 7 Drawing Sheets

(51) Int. Cl.
| | | |
|---|---|---|
| C08L 65/00 | (2006.01) | |
| C01B 32/20 | (2017.01) | |
| C01B 32/174 | (2017.01) | |
| C01B 32/194 | (2017.01) | |
| C01B 32/152 | (2017.01) | |
| C09C 1/48 | (2006.01) | |
| C08K 5/42 | (2006.01) | |
| C08K 5/06 | (2006.01) | |

(52) U.S. Cl.
CPC .......... *C01B 32/174* (2017.08); *C01B 32/194* (2017.08); *C01B 32/20* (2017.08); *C08L 65/00* (2013.01); *C09C 1/48* (2013.01); *C08K 3/04* (2013.01); *C08K 3/041* (2017.05); *C08K 3/042* (2017.05); *C08K 3/046* (2017.05); *C08K 5/06* (2013.01); *C08K 5/42* (2013.01); *C08K 2201/011* (2013.01)

(58) Field of Classification Search
CPC . C01B 31/0213; C01B 31/0273; C08L 65/00; C08K 5/42; C08K 5/06; C08K 3/04; C08K 2201/011; C08K 3/042; C08K 3/041; C08K 3/046
See application file for complete search history.

(56) References Cited

U.S. PATENT DOCUMENTS

| | | | |
|---|---|---|---|
| 4,360,644 A | 11/1982 | Naarmann et al. | |
| 4,661,532 A * | 4/1987 | Morin | C08G 18/5021 238/370 |
| 4,746,325 A * | 5/1988 | Nakamura | C10L 1/326 44/280 |
| 4,844,841 A * | 7/1989 | Koller | C07C 309/38 546/347 |
| 5,779,880 A | 7/1998 | Maruyama et al. | |
| 9,157,003 B2 * | 10/2015 | Landorf | B82Y 30/00 |
| 9,193,132 B2 * | 11/2015 | Zhamu | B32B 9/04 |
| 9,360,505 B2 * | 6/2016 | Zhamu | H01L 23/373 |
| 9,363,932 B2 * | 6/2016 | Wang | H05K 7/20963 |
| 9,382,117 B2 * | 7/2016 | Zhamu | C01B 31/043 |
| 9,413,007 B2 * | 8/2016 | Sun | H01M 4/625 |
| 9,428,388 B2 * | 8/2016 | Lakrout | C08G 59/687 |
| 9,803,124 B2 * | 10/2017 | Zhamu | C09K 5/14 |
| 9,845,275 B2 * | 12/2017 | Kim | C10C 3/04 |
| 9,890,469 B2 * | 2/2018 | Zhamu | C01B 32/182 |
| 9,899,120 B2 * | 2/2018 | Zhamu | C01B 32/192 |
| 9,950,930 B2 * | 4/2018 | Yoo | C01B 32/184 |
| 10,131,803 B2 * | 11/2018 | Sohn | C09D 7/20 |
| 2003/0001141 A1 * | 1/2003 | Sun | B82Y 10/00 252/301.35 |
| 2005/0100960 A1 * | 5/2005 | Dai | B82Y 10/00 435/7.1 |
| 2006/0189822 A1 | 8/2006 | Yoon et al. | |
| 2007/0195488 A1 * | 8/2007 | Kim | H01G 9/058 361/503 |
| 2007/0221913 A1 * | 9/2007 | Lee | B82Y 10/00 257/40 |
| 2008/0287638 A1 * | 11/2008 | Reynolds | B29C 73/163 528/59 |
| 2009/0111936 A1 | 4/2009 | Wedlock | |
| 2009/0226684 A1 | 9/2009 | Bahnmuller et al. | |
| 2011/0186785 A1 * | 8/2011 | Kato | B82Y 30/00 252/510 |
| 2012/0309095 A1 * | 12/2012 | Huang | C09K 11/06 436/84 |
| 2012/0326093 A1 | 12/2012 | Landorf | |
| 2013/0187084 A1 | 7/2013 | Yoon et al. | |
| 2013/0236715 A1 * | 9/2013 | Zhamu | B82Y 30/00 428/220 |
| 2014/0083752 A1 * | 3/2014 | Walczak | C01B 31/0273 174/257 |
| 2014/0323596 A1 * | 10/2014 | Jeong | B82Y 30/00 516/77 |
| 2015/0115195 A1 * | 4/2015 | Lakrout | C08G 59/687 252/71 |
| 2016/0190590 A1 * | 6/2016 | Sohn | H01M 4/139 429/233 |
| 2016/0244386 A1 * | 8/2016 | Kim | C10C 3/04 |
| 2017/0036914 A1 * | 2/2017 | Sohn | C09K 5/14 |
| 2017/0158512 A1 * | 6/2017 | Sohn | C09D 7/20 |
| 2017/0166449 A1 * | 6/2017 | Yoo | C01B 32/184 |

FOREIGN PATENT DOCUMENTS

| | | |
|---|---|---|
| EP | 2228856 A1 | 9/2010 |
| JP | S56103241 A | 8/1981 |
| JP | S61164632 A | 7/1986 |
| JP | S62275195 A | 11/1987 |
| JP | H01242691 A | 9/1989 |
| JP | H07-150187 | 6/1995 |
| JP | 2005320220 A | 11/2005 |
| JP | 2007277734 A | 10/2007 |
| JP | 2009190940 A | 8/2009 |
| JP | 2012056788 A | 3/2012 |
| JP | 2012067277 A | 4/2012 |
| JP | H05-000810 B2 | 8/2012 |
| JP | 2013136480 A | 7/2013 |
| KR | 20060054961 A | 5/2006 |
| KR | 20070102266 A | 10/2007 |
| KR | 20100112621 A | 10/2010 |
| KR | 20100137621 A | 12/2010 |
| KR | 20110101347 A | 9/2011 |

OTHER PUBLICATIONS

Liu et al., Stable non-covalent functionalisation of multi-walled carbon nanotubes by pyrene-polyethylene glycol through π-π stacking, New J. Chem., 2009, 33, 1017-1024 (publ. online Dec. 15, 2008).*
International Search Report for Application No. PCT/KR2014/007064 dated Nov. 21, 2014.
Tomonari, Yasuhiko, et al., Solubilization of Single-Walled Carbon Nanotubes by using Polycyclic Aromatic Ammonium Amphiphiles in Water—Strategy for the Design of High-Performance Solubilizers, Chem. European Journal, 2006, vol. 12, No. 15, pp. 4027-4034.
Majcherczyk A et al: "Oxidation of Polycyclic Aromatic Hydrocarbons (PAH) by Laccase of Trametes Versicolor", Enzyme and Microbial Technology, Apr. 1, 1998, vol. 22, No. 5, Stoneham, MA, USA.
Supplementary European Search Report for Application No. EP14833087, dated Feb. 24, 2017.

* cited by examiner

[FIG. 1a]
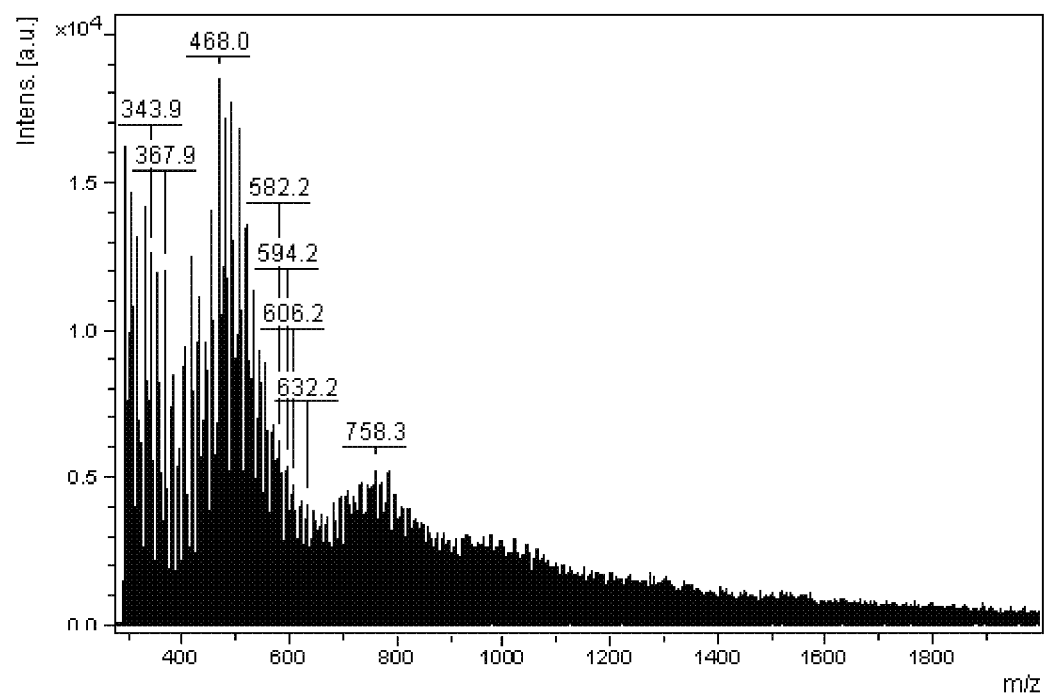
[FIG. 1b]
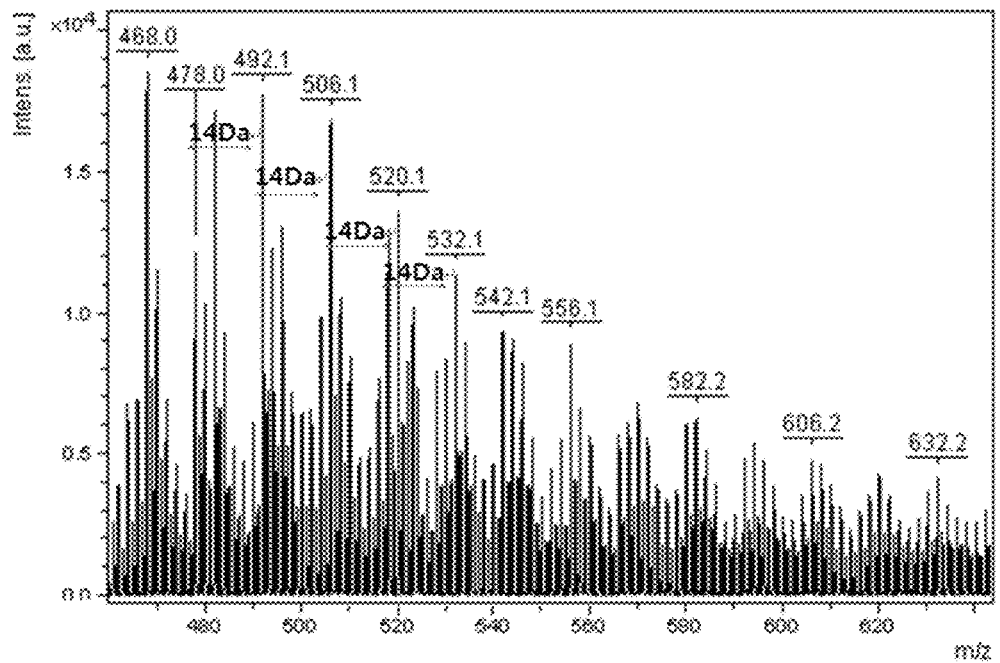

[FIG. 2a]
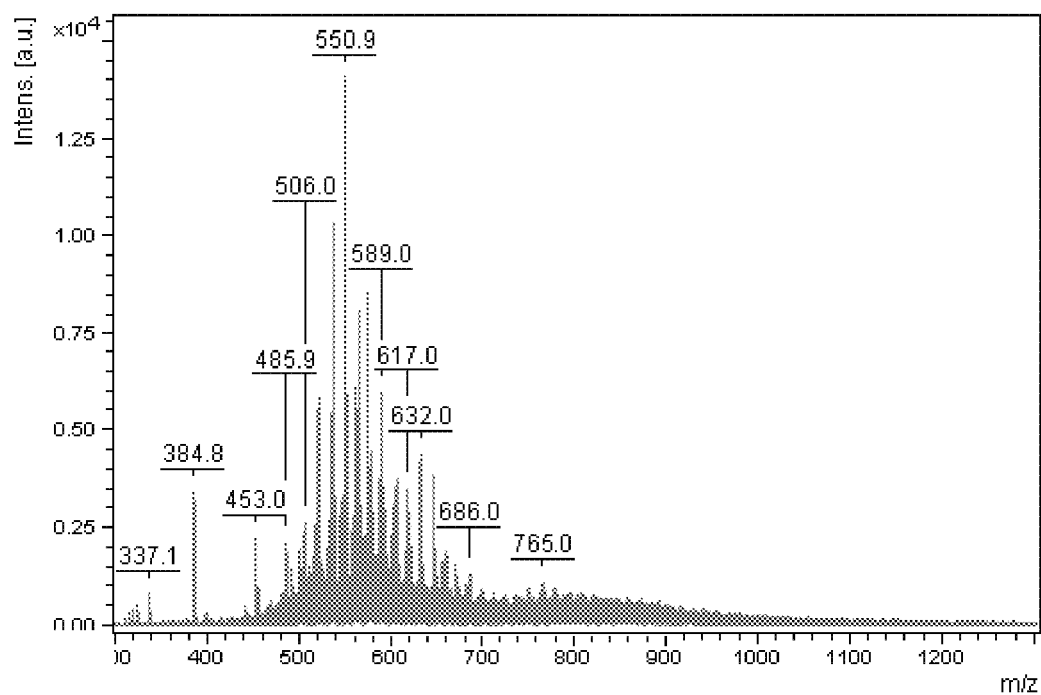
[FIG. 2b]
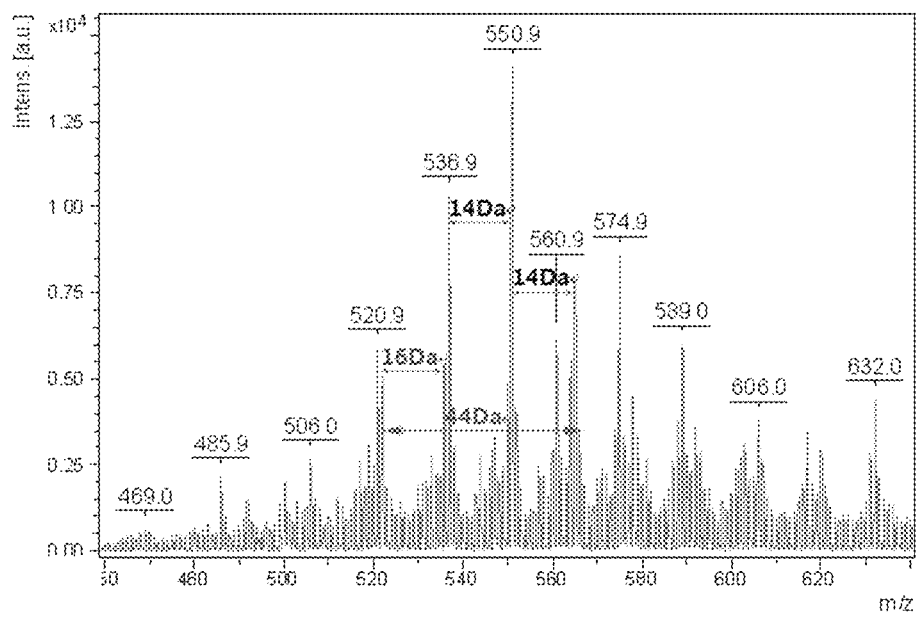

[FIG. 3]
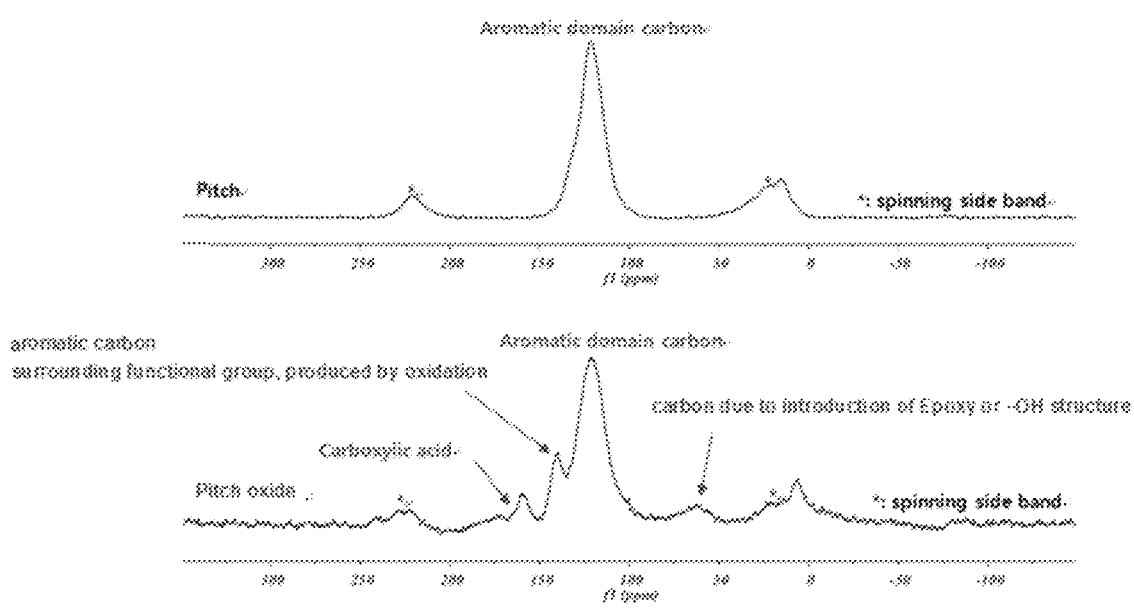

[FIG. 4]
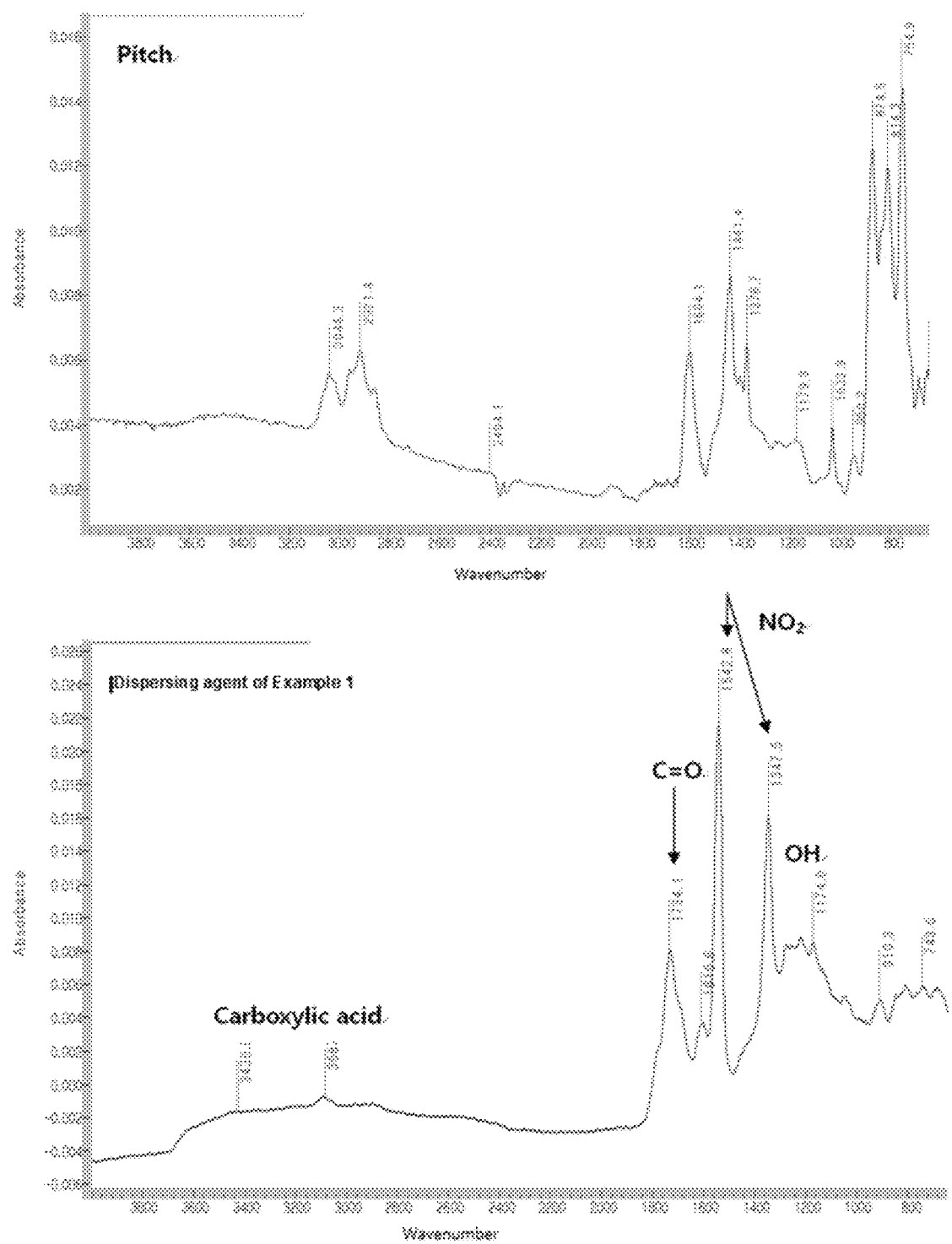

[FIG. 5]
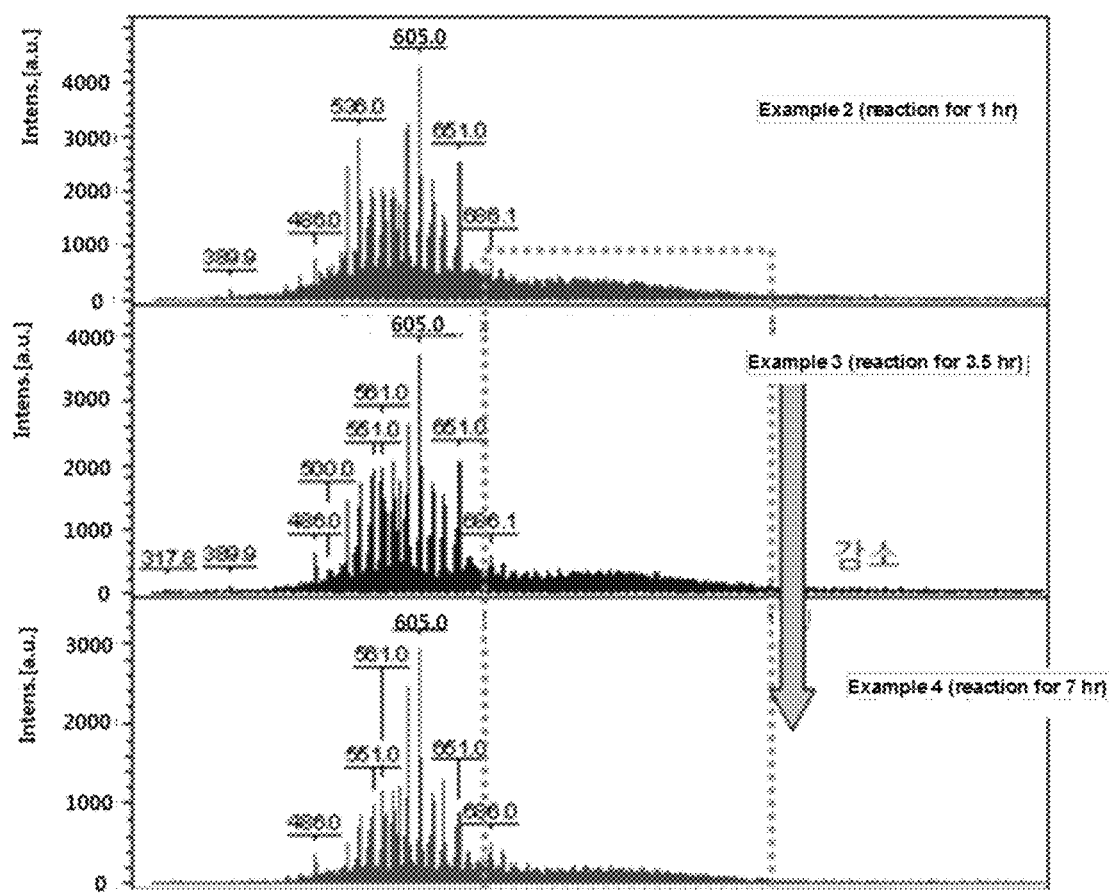

[FIG. 6]
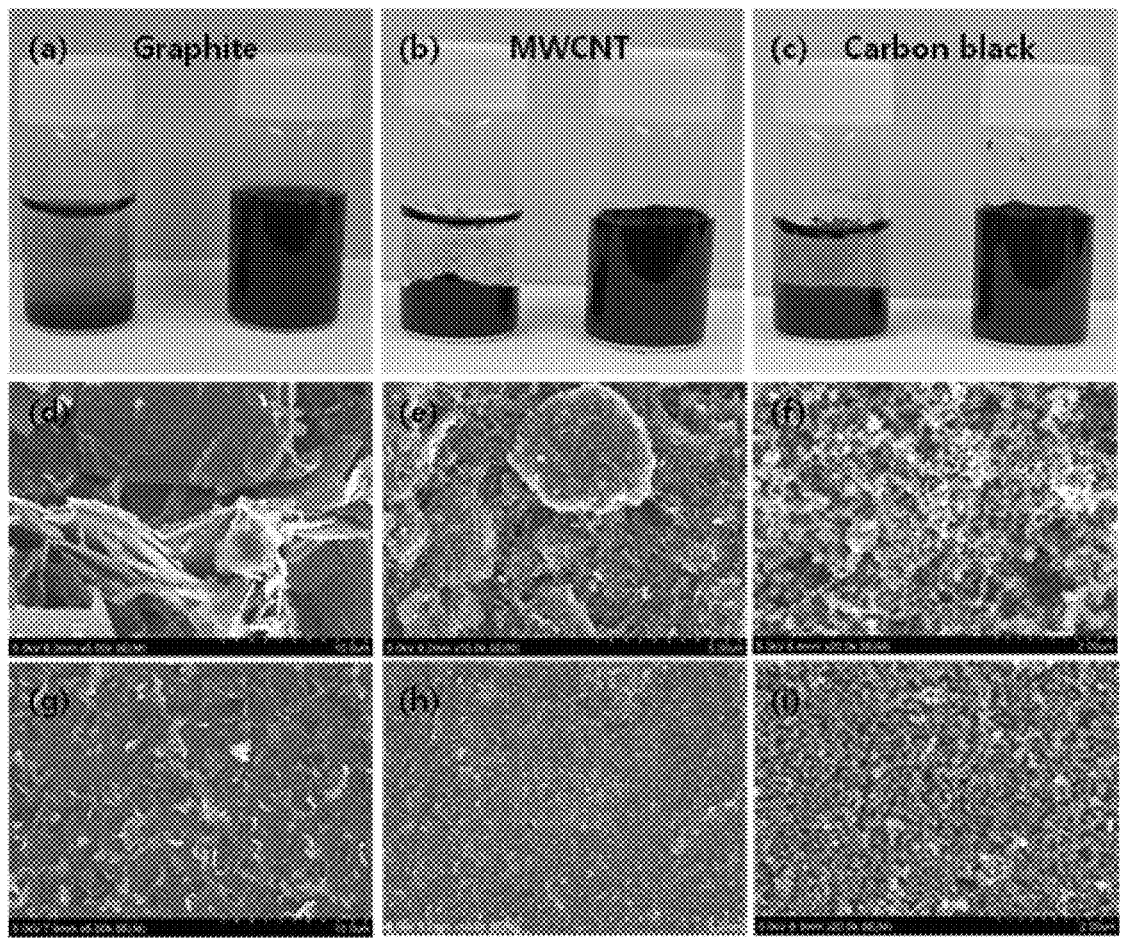
[FIG. 7]
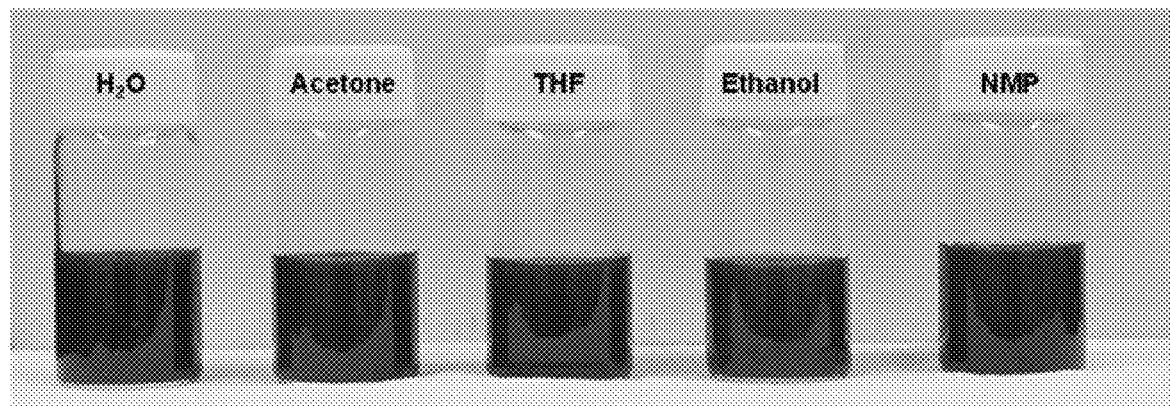

[FIG. 8]
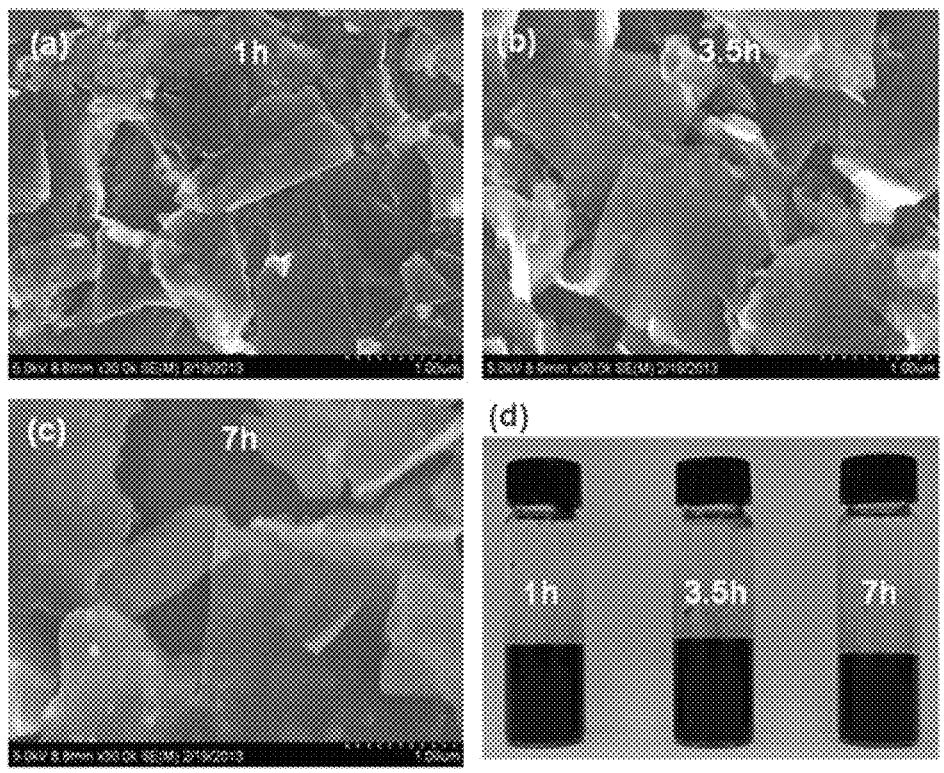
[FIG. 9]
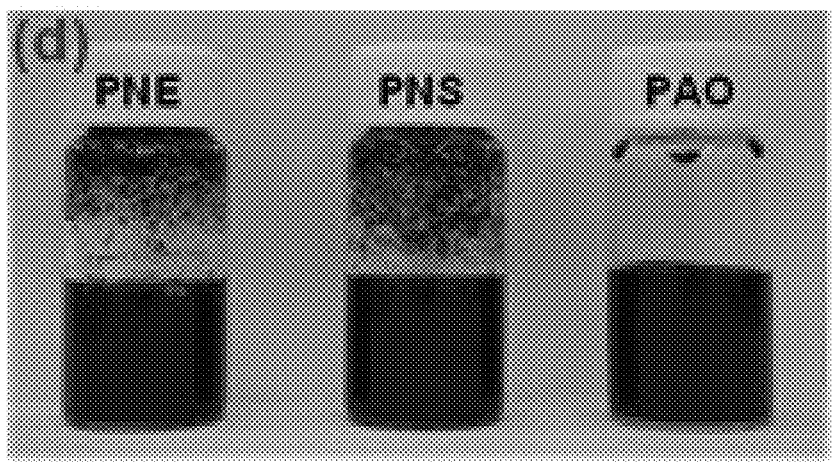

DISPERSING AGENT, ITS PREPARATION METHOD AND DISPERSED COMPOSITION OF CARBON-BASED MATERIAL COMPRISING THE SAME

CROSS-REFERENCE TO RELATED APPLICATION

The application is a national phase entry under 35 U.S.C. § 371 of International Application No. PCT/KR2014/007064, filed Jul. 31, 2014, which claims priority to Korean Application No. 10-2013-0091625, filed Aug. 1, 2013 and Korean Application No. 10-2014-0098033, filed Jul. 31, 2014, the disclosures of which are incorporated herein by reference.

TECHNICAL FIELD

The present invention relates to a novel dispersing agent capable of uniformly dispersing a variety of carbon-based materials in different media including aqueous solvents and a preparation method thereof, and a carbon-based material-dispersed composition including the same.

BACKGROUND ART

Recently, many carbon-based materials have been studied and used in various products such as thermoplastic resin compositions, secondary batteries, solar cells, display materials, electronic materials, etc. or technical fields. For example, to further improve capacity or electrical characteristics of secondary batteries or solar cells, use of carbon nanotubes, derivatives thereof, etc. has been considered and tried, and to further improve characteristics of various semiconductor devices or display devices, application of carbon-based nanomaterials such as graphene, derivatives thereof, etc. has been tried. In addition, for the purpose of improving mechanical properties of thermoplastic resin compositions or providing them with new properties such as electrical conductivity, etc., use of various carbon-based materials has been tried.

However, in order to achieve desired physical properties by applying carbon-based materials such as carbon nanotubes, graphene, carbon black, fullerene-based materials or derivatives thereof, etc. to various fields, it is required to uniformly disperse these carbon-based materials at high concentrations in other various media including aqueous solvents. For example, to further improve electrical properties of a secondary battery by using a conductive material including carbon nanotube, etc., it is necessary to uniformly disperse these carbon-based materials at high concentrations in media such as aqueous solvents, etc.

However, since most carbon-based materials such as carbon nanotubes, graphene, fullerene-based materials, etc. are generally composed of carbon-carbon bonds, it is difficult to uniformly disperse these carbon-based materials at high concentrations in media in many cases. For this reason, there has been a limitation that it is difficult to take advantages of the carbon-based materials. In order to solve this problem, use of dispersing agents for more uniform dispersion of high concentrations of carbon-based materials in various media has been considered.

However, dispersing agents which have been previously known or studied did not sufficiently disperse carbon-based materials according to the type of media, or must be used in a large amount for effective dispersion of the carbon-based materials. Moreover, the previously known dispersing agents have the disadvantage of requiring very high production costs because their raw materials are expensive or a complex preparation process is required.

For this reason, there is a continuous demand for a novel dispersing agent which is able to uniformly disperse a variety of carbon-based materials such as carbon nanotubes, graphene or fullerene-based materials at high concentrations in various media, for example, environmentally friendly aqueous solvents, even though a relatively small amount thereof is used, and which can be obtained at lower costs by a simpler preparation process.

DISCLOSURE

Technical Problem

The present invention provides a novel dispersing agent capable of uniformly dispersing a variety of carbon-based materials at high concentrations in different media including aqueous solvents and a preparation method thereof.

Further, the present invention provides a carbon-based material-dispersed composition, including the novel dispersing agent and carbon-based materials uniformly dispersed thereby.

Technical Solution

The present invention provides a dispersing agent including a mixture of a plurality of polyaromatic hydrocarbon oxides, in which the mixture contains the polyaromatic hydrocarbon oxides having a molecular weight of 300 to 1000 in an amount of 60% by weight or more.

In the dispersing agent, when a plurality of polyaromatic hydrocarbon oxides are subjected to elemental analysis, the oxygen content may be 12 to 50% by weight of the total element content of the mixture.

Further, in the dispersing agent, polyaromatic hydrocarbon oxide may have a structure in which one or more oxygen-containing functional groups bind to aromatic hydrocarbon containing 5 to 30 benzene rings. More specifically, the aromatic hydrocarbon may have 7 to 20 benzene rings in the structure, and the oxygen-containing functional group may be one or more selected from the group consisting of a hydroxy group, an epoxy group, a carboxyl group, a nitro group and a sulfonic group.

The above described dispersing agent may be used for dispersion of carbon-based materials in solvents. More specific example of the carbon-based material to be dispersed by the dispersing agent may be one or more selected from the group consisting of graphene, carbon nanotubes, graphite, carbon black, fullerene-based materials and derivatives thereof, and may also include other various carbon-based materials.

Meanwhile, the present invention provides a preparation method of the dispersing agent, including the step of oxidizing a mixture including polyaromatic hydrocarbons having a molecular weight of 200 to 1500 in the presence of an oxidizing agent.

In the preparation method of the dispersing agent, the oxidizing agent may include one or more selected from the group consisting of nitric acid ($HNO_3$), sulfuric acid ($H_2SO_4$), hydrogen peroxide ($H_2O_2$), ammonium cerium (IV) sulfate (($NH_4)_4Ce(SO_4)_4$) and ammonium cerium(IV) nitrate (($NH_4)_2Ce(NO_3)_6$).

In the preparation method, the mixture including polyaromatic hydrocarbons having a molecular weight of 200 to 1500 may include a plurality of aromatic hydrocarbons containing 5 to 50 benzene rings.

Further, the oxidation step may be carried out in an aqueous solvent at a reaction temperature of 10 to 90° C. for 0.5 to 20 hours.

Further, the mixture including polyaromatic hydrocarbons having a molecular weight of 200 to 1500 as a starting material of the preparation method may be derived from pitches which are obtained from fossil fuel or products thereof.

Further, the preparation method may further include the step of purifying the resultant after the oxidation step so as to obtain a mixture of a plurality of polyaromatic hydrocarbon oxides, and this purification step may be performed by including the step of centrifuging the resultant of the oxidation step.

Meanwhile, the present invention provides a carbon-based material-dispersed composition including the carbon-based material; and the above described dispersing agent.

In the dispersed composition, the carbon-based material may be one or more selected from the group consisting of graphene, carbon nanotubes, graphite, carbon black, fullerene-based materials, and derivatives thereof.

This dispersed composition is a composition in which high concentrations of carbon-based materials are uniformly dispersed at higher concentrations in media such as aqueous solvents, etc. owing to the action of the above described dispersing agent, and it can be very preferably applied to various products such as secondary batteries, solar cells, display materials, electronic materials, etc. in order to improve physical properties of the products using carbon-based materials.

Effect of the Invention

According to the present invention, provided are a novel dispersing agent capable of uniformly dispersing a variety of carbon-based materials at high concentrations in different media including aqueous solvents and a preparation method thereof. In particular, this dispersing agent can be obtained by a very simple preparation process using inexpensive raw materials such as pitches obtained from waste of fossil fuels, etc. and thus, it requires very low production costs while showing excellent dispersibility for carbon-based materials.

As a result, this dispersing agent overcomes the limitations of the conventional dispersing agents, and disperses a variety of carbon-based materials in media with low production costs. Accordingly, it can be very preferably applied to various products such as secondary batteries, solar cells, display materials, electronic materials, etc. in order to improve physical properties of the products using carbon-based materials.

BRIEF DESCRIPTION OF DRAWINGS

FIGS. 1a and 1b (magnifications of the molecular weight range of 400 to 500) show the molecular weight distribution of pitch, which was analyzed by MALDI-TOF mass spectrum;

FIGS. 2a and 2b (magnifications of the molecular weight range of 400 to 500) show the molecular weight distribution of the dispersing agent of Example 1, which was analyzed by MALDI-TOF mass spectrum;

FIG. 3 shows the results of 13C CPMAS NMR analysis of pitch and the dispersing agent of Example 1;

FIG. 4 shows the results of FT-IR analysis of pitch and the dispersing agent of Example 1;

FIG. 5 shows the results of comparing the molecular weight distributions of the dispersing agents of Examples 2 to 4, which were analyzed by MALDI-TOF mass spectrum;

FIG. 6 shows images for observation with the naked eye and SEM analysis results, in which dispersibility of carbon-based materials was compared between use of the dispersing agent of Example and use of no dispersing agent in Experimental Example 2;

FIG. 7 is an image for observation with the naked eye showing dispersibility of the carbon-based material (graphene flake) in various solvents in the case of using the dispersing agent of Example in Experimental Example 2;

FIG. 8 shows images for observation with the naked eye and SEM analysis results, in which dispersibility of carbon-based materials was compared between use of the dispersing agents of Examples 2 to 4 in Experimental Example 2; and FIG. 9 is an image for observation with the naked eye showing that dispersibility of carbon-based materials was compared between use of the dispersing agent of Example 1 and use of the dispersing agents of Comparative Examples 1 and 2 in Experimental Example 2.

DETAILED DESCRIPTION OF THE EMBODIMENTS

Hereinafter, a novel dispersing agent, a preparation method thereof, and a carbon-based material-dispersed composition including the same according to specific embodiments of the present invention will be described in more detail.

First, the "dispersing agent", as used herein, refers to any component for uniform dispersion of other components, for example, carbon-based materials such as graphene, carbon nanotube, etc. in an aqueous solvent, an organic solvent, or other liquid medium. A composition in which such "dispersing agent" and other components such as carbon-based materials to be dispersed are dispersed in a liquid medium is referred to as "dispersed composition", and such "dispersed composition" may exist in various forms such as solution, slurry, or paste. Further, such "dispersed composition" can be used in various applications such as a conductive composition for a secondary battery; an electrode or a conductive composition applied to a preparation process of various batteries, displays, devices, etc.; an active material composition for a secondary battery; a composition for the production of various polymers or resin complexes; or an ink or a paste composition applied to a production process of various electronic materials, devices, etc., and its application is not particularly limited. It is defined that as long as both the "dispersing agent" and the component to be dispersed are included in a liquid medium, the composition is included in the scope of the above "dispersed composition" regardless of its state or use.

Further, the "polyaromatic hydrocarbon", as used herein, refers to an aromatic hydrocarbon compound, in which aromatic rings, for example, two or more, or 5 or more benzene rings bind to and are included in the structure of a single compound. Further, the "polyaromatic hydrocarbon oxide" refers to any compound, in which one or more oxygen-containing functional groups bind to its chemical structure, resulting from reaction of the above described "polyaromatic hydrocarbon" with an oxidizing agent. In this regard, the oxygen-containing functional group to be introduced into the "polyaromatic hydrocarbon" by reaction with the oxidizing agent may be any functional group having one or more oxygens therein, which is able to bind to an aromatic ring, such as a hydroxy group, an epoxy group, a carboxyl group, a nitro group, a sulfonic group, etc.

Further, the "carbon-based material", as used herein, refers to any material mainly containing carbon-carbon bonds, for example, it encompasses graphene, carbon nanotube, graphite, carbon black, C60 fullerene, other similar fullerene-based materials, derivatives thereof or the like. However, it can be interpreted that the "polyaromatic hydrocarbon" or oxide thereof as the main ingredient or the main raw material of the "dispersing agent" of the present invention is not included in the scope of the "carbon-based material".

Meanwhile, according to one embodiment of the present invention, provided is a dispersing agent including a mixture containing polyaromatic hydrocarbon oxides having a molecular weight of approximately 300 to 1000 in an amount of approximately 60% by weight or more as the mixture of a plurality of polyaromatic hydrocarbon oxides.

Pitch discharged as a waste during purification of fossil fuels such as petroleum, coal, etc. is a by-product used in the production of asphalt, and it may be a viscous mixture containing a plurality of polyaromatic hydrocarbons having many aromatic rings. However, the experimental results of the present inventors showed that when pitches are subjected to an oxidation process using an oxidizing agent, at least a portion of the polyaromatic hydrocarbons having excessively high molecular weight among the polyaromatic hydrocarbons contained in the pitches is degraded, and a mixture of polyaromatic hydrocarbons having a relatively narrow molecular weight distribution is obtained. Also, it was found that one or more oxygen-containing functional groups are introduced into aromatic rings of each polyaromatic hydrocarbon, thereby obtaining the mixture containing a plurality of polyaromatic hydrocarbon oxides.

In detail, when the mixture of polyaromatic hydrocarbon oxides which is obtained by the method is analyzed by MALDI-TOF MS, polyaromatic hydrocarbon oxides having a molecular weight of approximately 300 to 1000 or approximately 300 to 700 are contained in an amount of approximately 60% by weight or more, or approximately 65% by weight or more, or approximately 70 to 95% by weight. The specific kind, structure and distribution of the polyaromatic hydrocarbon oxides contained in the mixture may differ depending on the kind or origin of the pitch used as the raw material, or the kind of the oxidizing agent, etc. However, the mixture of polyaromatic hydrocarbon oxides included in the dispersing agent of one embodiment at least contains a plurality of polyaromatic hydrocarbon oxides having a structure in which one or more oxygen-containing functional groups are introduced into polyaromatic hydrocarbon having 5 to 30, or 7 to 20 benzene rings. The polyaromatic hydrocarbon oxides in the mixture have the above described molecular weight distribution, that is, oxides having a molecular weight of approximately 300 to 1000 or approximately 300 to 700 are included in an amount of approximately 60% by weight or more, based on the total weight of the mixture.

In this regard, the kind of the oxygen-containing functional group may differ depending on the kind of the oxidizing agent which is used in the oxidation process of pitches, etc. For example, it may be one or more selected from the group consisting of a hydroxy group, an epoxy group, a carboxyl group, a nitro group and a sulfonic group.

The polyaromatic hydrocarbon oxides satisfying the above described structural properties and molecular weight distribution, and the mixture thereof may have a hydrophobic π-domain of aromatic rings and a hydrophilic region by the oxygen-containing functional groups binding to the aromatic rings at the same time. Of them, the hydrophobic π-domain participates in π-π interaction with the surface of carbon-based materials having carbon-carbon bonds, such as graphene, carbon nanotube, etc., and the hydrophilic region creates a repulsive force between single graphenes or single carbon nanotubes. As a result, the dispersing agent of one embodiment which includes the mixture of the polyaromatic hydrocarbon oxides exists between molecules of carbon-based materials such as graphene or carbon nanotube in a liquid medium such as an aqueous solvent, etc., so as to uniformly disperse the carbon-based materials. Therefore, the dispersing agent of one embodiment was found to show excellent dispersibility of uniformly dispersing the carbon-based materials at a higher concentration even though it is used in a relatively small amount.

Moreover, because the dispersing agent of one embodiment itself is able to show water solubility owing to its hydrophilic region as described above, it is able to uniformly disperse the carbon-based materials in eco-friendly aqueous solvents. In particular, as demonstrated in the following Examples, the dispersing agent was found to show excellent dispersibility of uniformly dispersing the carbon-based materials at a high concentration in various organic solvents such as acetone, THF, ethanol and NMP as well as in eco-friendly aqueous solvents.

Particularly, it is difficult to achieve the above described excellent dispersibility by using only individual 1~2 kinds of the polyaromatic hydrocarbon oxides, but the above described excellent dispersibility can be achieved by using the mixture of a plurality of polyaromatic hydrocarbon oxides which satisfy the above described molecular weight distribution (molecular weight range and content range).

Additionally, the dispersing agent of one embodiment can be prepared from inexpensive raw materials such as pitch through a simplified oxidation process, thereby greatly reducing production costs of the dispersing agent for carbon-based materials and further simplifying the preparation process.

As a result, the dispersing agent of one embodiment overcomes the limitations of the conventional dispersing agents, and uniformly disperses a variety of carbon-based materials at high concentrations in various liquid media with low production costs. Accordingly, it can be very preferably applied to various products such as secondary batteries, solar cells, display materials, electronic materials, etc. in order to improve physical properties of the products using carbon-based materials.

Meanwhile, when a plurality of polyaromatic hydrocarbon oxides included in the dispersing agent of one embodiment are subjected to elemental analysis, the oxygen content in the total mixture may be approximately 12 to 50% by weight or approximately 15 to 45% by weight of the total element content. This oxygen content reflects the introduction degree of oxygen-containing functional groups in the polyaromatic hydrocarbon oxides by the oxidation process. As satisfying this oxygen content, the above described hydrophilic region can be included at the appropriate degree. As a result, the carbon nanotubes can be more properly dispersed using the above described dispersing agent.

The oxygen content can be calculated by elemental analysis of a plurality of polyaromatic hydrocarbon oxides which are included in the above described mixture. That is, when the mixture sample (e.g., approximately 1 mg) is heated on, for example, a thin foil at a high temperature of approximately 900° C., the foil is suddenly melted and the temperature is increased to approximately 1500 to 1800° C. Due to the high temperature, gas is generated from the mixture sample, and gas is collected for measurement and analysis of the contents of elements. From the results of the elemental analysis, the total element content of carbon, oxygen, hydrogen, and nitrogen which are contained in a plurality of the polyaromatic hydrocarbon oxides can be measured and analyzed, and the oxygen content with respect to the total element content can be calculated.

The above described dispersing agent of one embodiment can be used for dispersion of a variety of carbon-based materials in solvents, and properly, used for uniform dispersion of high concentration of the carbon-based materials in an aqueous solvent. The kind of the carbon-based materials of which dispersibility can be improved by using the dispersing agent is, but not particularly limited to, for example, graphene, carbon nanotube, graphite, carbon black, fullerene-based materials, derivatives thereof or the like. However, it is apparent that the dispersing agent of one embodiment can be properly used for dispersion of other various carbon-based materials.

Meanwhile, according to another embodiment of the present invention, provided is a preparation method of the above described dispersing agent. The preparation method of the dispersing agent may include the step of oxidizing the mixture including polyaromatic hydrocarbons having a molecular weight of approximately 200 to 1500 in the presence of an oxidizing agent.

As described above, pitch discharged as a waste during purification of fossil fuels such as petroleum, coal, etc. may be a viscous or powdery mixture containing a plurality of polyaromatic hydrocarbons. Apparently, the specific kind, structure, composition ratio, and molecular weight distribution of the polyaromatic hydrocarbon may differ depending on the raw material or origin of the pitch, etc., but the pitch may contain a plurality of polyaromatic hydrocarbons having 5 to 50 aromatic rings, for example, benzene rings in its structure, and it may generally contain polyaromatic hydrocarbons having a molecular weight of 200 to 1500. For example, the mixture (e.g., pitch) containing polyaromatic hydrocarbons having a molecular weight of 200 to 1500, which is used as a starting material in the preparation method of another embodiment, may include the polyaromatic hydrocarbons having a molecular weight within the above range in an amount of approximately 80% by weight or more, or approximately 90% by weight or more.

However, if the mixture containing polyaromatic hydrocarbons such as pitch is subjected to an oxidation process using an oxidizing agent, the polyaromatic hydrocarbons having an excessively high molecular weight among the polyaromatic hydrocarbons contained in the pitch are degraded, and a mixture of polyaromatic hydrocarbons having a relatively narrow molecular weight distribution can be obtained. For example, polyaromatic hydrocarbons having a molecular weight of more than approximately 1000 or approximately 700 may be degraded into those having a low molecular weight. Further, one or more oxygen-containing functional groups are introduced into aromatic rings of each polyaromatic hydrocarbon, and therefore, the mixture including a plurality of polyaromatic hydrocarbon oxides, namely, the dispersing agent of one embodiment can be very simply prepared.

In the preparation method of the dispersing agent, the kind of the oxidizing agent is not particularly limited. Any oxidizing agent can be used without limitation, as long as it is able to cause the oxidation reaction capable of introducing oxygen-containing functional groups into aromatic hydrocarbons. Specific examples of the oxidizing agent may include nitric acid ($HNO_3$), sulfuric acid ($H_2SO_4$), hydrogen peroxide ($H_2O_2$), ammonium cerium(IV) sulfate (($NH_4)_4Ce(SO_4)_4$), ammonium cerium(IV) nitrate (($NH_4)_2Ce(NO_3)_6$), etc. A mixture of two or more selected therefrom can be also used.

The oxidation step may be carried out in an aqueous solvent at a reaction temperature of approximately 10 to 90° C. for approximately 0.5 to 20 hours. In a specific embodiment, the oxidation step may be carried out by adding a predetermined amount of the mixture including the polyaromatic hydrocarbons in the presence of a liquid oxidizing agent such as sulfuric acid and/or nitric acid at room temperature, for example, at approximately 20° C. or 80° C. for approximately 1 to 12 hours. The properties of the above described dispersing agent, for example, oxidation degree of polyaromatic hydrocarbons can be properly controlled by controlling the reaction temperature or time of the oxidation step, thereby preparing a dispersing agent having the desired properties.

Further, as described above, the mixture containing polyaromatic hydrocarbons having a molecular weight of 200 to 1500, which is used as a starting material of the preparation method, may be derived from pitch obtained from fossil fuels or products thereof, and the kind, structure or molecular weight distribution of the polyaromatic hydrocarbons may differ depending on the kind of the raw material, etc. Nevertheless, the dispersing agent of one embodiment having excellent dispersibility for carbon-based materials can be simply prepared, as the mixture containing polyaromatic hydrocarbons having a molecular weight of 200 to 1500, which is derived from pitch, etc., is subjected to the oxidation process, as described above.

Meanwhile, the above described preparation method may further include the step of purifying the resultant after the oxidation step to obtain the mixture of a plurality of polyaromatic hydrocarbon oxides. Such purification step may be performed by including the step of centrifuging the resultant of the oxidation step. Owing to the purification step, the mixture of polyaromatic hydrocarbon oxides satisfying the molecular weight distribution of one embodiment can be properly obtained with higher purity, and the dispersing agent including the same can be used for more proper dispersion of the carbon-based materials in a liquid medium such as aqueous solvents, etc.

Meanwhile, according to still another embodiment of the present invention, provided is a carbon-based material-dispersed composition including the carbon-based material; and the above described dispersing agent of one embodiment.

In the dispersed composition, the carbon-based material may be one or more selected from the group consisting of graphene, carbon nanotube, graphite, carbon black, fullerene-based materials and derivatives thereof.

Owing to action of the above described dispersing agent, this dispersed composition may be in the state, in which a high concentration of carbon-based materials is uniformly dispersed at a higher concentration in a liquid medium such as aqueous solvents, etc. Further, this dispersed composition may be used in various applications such as a conductive composition for a secondary battery, an electrode composition or an active material composition according to the kind of the carbon-based material, use of other additional components, or specific composition. Further, its state may have various forms such as solutions, slurries, or pastes according to the kind or specific composition of the carbon-based material.

However, the dispersed composition having the various applications, kinds or states can be obtained by applying a composition and a preparation method typically known to those skilled in the art, except that the dispersing agent of one embodiment is used. Therefore, additional description thereof will be omitted.

The dispersed composition described above may be a liquid composition in which carbon-based materials are uniformly dispersed at a higher concentration, owing to use of the dispersing agent of one embodiment. Therefore, this dispersed composition can be very preferably applied to various products such as solar cells, display materials, electronic materials, etc. in order to improve physical properties of the products using carbon-based materials.

Hereinafter, actions and effects of the present invention will be described in more detail with reference to specific Examples of the present invention. However, these Examples are for illustrative purposes only, and the scope of the present invention is not intended to be limited by these Examples.

EXAMPLE 1

Preparation of Dispersing Agent

Pitch which is a petroleum by-product obtained from POSCO was subjected to the following oxidation and purification processes to produce a dispersing agent of Example 1.

First, 0.5 to 1.5 g of pitch was added to 75 ml of a solution mixture of sulfuric acid/nitric acid (a volume ratio of 3:1) and oxidation reaction was performed at 70° C. for approximately 3.5 hours.

Thereafter, the pitch reaction solution resulting from the oxidation reaction was cooled to room temperature, and diluted with approximately 5 volumes of distilled water, followed by centrifugation at approximately 3500 rpm for 30 minutes. Subsequently, the supernatant was discarded, and the same amount of distilled water was added and resuspended, followed by centrifugation under the same conditions. Finally, the pellet was recovered and dried. Consequently, the dispersing agent of Example 1 was produced.

First, the molecular weight distribution of the pitch which was used as a raw material during the production process of the dispersing agent was analyzed by MALDI-TOF mass spectrum, and the results are shown in FIGS. 1a and 1b (magnifications of the molecular weight range of 400 to 500), and the molecular weight distribution of the dispersing agent of Example 1 was also analyzed in the same manner, and the results are shown in FIGS. 2a and 2b (magnifications of the molecular weight range of 400 to 500). This analysis was performed using a MALDI-TOF mass spectrum spectrometer (Ultraflex II, Bruker), after the pitch or dispersing agent was added to a matrix and they were mixed and dried.

Referring to FIGS. 1a and 1b (magnification), it was found that the pitch contained polyaromatic hydrocarbons having a molecular weight of 200 to 1500. Particularly, in the magnification of FIG. 1b, high peaks were detected at an interval of a molecular weight of 14 Da, indicating that a plurality of polyaromatic hydrocarbons having different numbers of aromatic rings (benzene rings) were linked by aliphatic hydrocarbons. In contrast, referring to FIGS. 2a and 2b (magnification), high peaks were detected at intervals of 44 Da and 16 D in polyaromatic hydrocarbons of the dispersing agent of Example 1, indicating that it exists in the form of a mixture of polyaromatic hydrocarbon oxides in which oxygen-containing functional groups such as —COOH or —OH are introduced into aromatic hydrocarbons. Oxides having a molecular weight of approximately 300 to 1000 or approximately 300 to 700 were found to be included in an amount of 60% by weight or more.

Further, the pitch (upper) used as a raw material and the dispersing agent of Example 1 (lower) were analyzed by 13C CPMAS NMR (Varian 400 MHz Solid-State NMR), respectively. The analysis results are compared and shown in FIG. 3. Referring to FIG. 3, peaks derived from carbons of aromatic hydrocarbons and some peaks derived from carbons of aliphatic hydrocarbons were detected, but no oxygen-containing functional groups were detected in the pitch. In contrast, the NMR analysis results of the dispersing agent of Example 1 show the peaks of oxygen-containing functional groups. The kind of the oxygen-containing functional groups was found to be an epoxy group, a hydroxy group or a carboxyl group.

Additionally, the pitch used as a raw material and the dispersing agent of Example 1 were analyzed in the powder form by FT-IR (Agilent 660-IR), and the analysis results are compared and shown in FIG. 4. FIG. 4 also shows appearance of the peaks of oxygen-containing functional groups in the dispersing agent of Example 1.

EXAMPLES 2 TO 4

Preparation of Dispersing Agent

Pitch which is a petroleum by-product obtained from POSCO (however, this pitch was different from the sample used in Example 1) was used, and dispersing agents of Examples 2 to 4 were produced in the same manner as in Example 1, except that the oxidation reaction was performed for 1 hour (Example 2), 3.5 hours (Example 3) or 7 hours (Example 4), respectively.

These dispersing agents were analyzed by MALDI-TOF mass spectrum in the same manner as in Example 1, and the results are compared and shown in FIG. 5. Referring to FIG. 5, as the oxidation time was increased, the content of the components (polyaromatic hydrocarbon oxides) having a molecular weight of more than approximately 1000 or approximately 700 in the dispersing agent was decreased, and as a result, dispersing agents were obtained in the form of a mixture including the polyaromatic hydrocarbon oxides having a molecular weight of approximately 300 to 1000 or approximately 300 to 700 at a higher content.

COMPARATIVE EXAMPLES 1 AND 2

Dispersing Agent

A commercialized dispersing agent (PNE) of the following Chemical Formula 1 was used as Comparative Example 1 and a dispersing agent (PNS) of the following Chemical Formula 2 was used as Comparative Example 2.

[Chemical Formula 1]

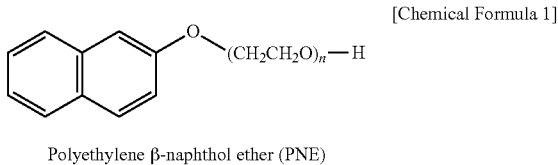

Polyethylene β-naphthol ether (PNE)

-continued

[Chemical Formula 2]

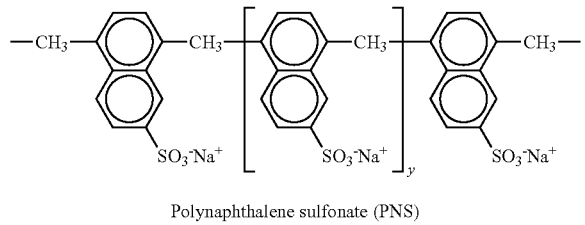

Polynaphthalene sulfonate (PNS)

EXPERIMENTAL EXAMPLE 1

Measurement of Oxygen Content of Dispersing Agent

Each 1 mg of the dispersing agent samples obtained in Examples 3 and 4 was heated on a thin foil at a high temperature of approximately 900° C. At this time, while the foil was suddenly melted, the temperature was increased to approximately 1500 to 1800° C., and gas was generated from the sample due to the high temperature. This gas was collected and subjected to elemental analysis to measure and analyze the contents of carbon, oxygen, hydrogen and nitrogen. The analysis results are compared with those of the pitch used in the production of each dispersing agent, and shown in the following Table 1.

TABLE 1

| Sample | C(wt %) | H(wt %) | N(wt %) | O(wt %) |
|---|---|---|---|---|
| Pitch | 95.5 | 4.5 | — | — |
| Example 3 | 40.0 | 1.8 | 7.6 | 38.0 |
| Example 4 | 40.0 | 1.5 | 7.8 | 39.2 |

Referring to Table 1, when the content of each element in the dispersing agents of Examples 3 and 4 was analyzed, the oxygen content was approximately 12 to 50% by weight or approximately 30 to 40% by weigh with respect to the total element content.

EXPERIMENTAL EXAMPLE 2

Test of Dispersibility of Dispersing Agent for Carbon-based Materials (1) 15 mg of the dispersing agent of Example 1 was dispersed in 100 ml of distilled water by sonication. Then, 0.5 g of graphite as a carbon-based material was added and stirred using a high speed homogenizer at 12000 rpm for approximately 1 hour, and subsequently, using a ultrasonicator (Tip-sonicator) with a 80% power of 400 W (that is, power of 320 W) twice at an interval of 30 minutes for dispersion. Further, the dispersing agents of Examples 2 to 4 were used to disperse and exfoliate graphite as a carbon-based material into graphene flakes using the high speed homogenizer and tip sonication, and then dispersibility of the dispersing agent for graphene flakes was tested in the same manner as in Example 1.

Further, other carbon-based material, CNT or carbon black was dispersed by the following method. 5 to 30% by weight of the dispersing agent of Example 1 based on the weight of CNT or carbon black was dissolved in 10 ml of distilled water, and then 0.1 g of CNT or carbon black as a carbon-based material was added, followed by batch-type sonication for dispersion.

In the above dispersion method, the content of the dispersing agent or experimental conditions of the equipment used for dispersion may vary depending on the type of the carbon-based material.

First, the results of testing the dispersion properties of the dispersing agent of Example 1 by the above method were observed with SEM analysis or the naked eye, and shown in FIG. 6.

First, referring to (a) to (c) of FIG. 6, when graphite, carbon nanotube (MWCNT) and carbon black were simply dispersed in water, most carbon-based materials were precipitated, and rarely dispersed (see the left of each image). In contrast, when the dispersing agent of Example 1 was used, they were very uniformly dispersed (see the right of each image). Such excellent dispersibility was also confirmed by the SEM analysis results.

(d) to (f) of FIG. 6 show the results of SEM analysis after dispersing the carbon-based materials in water without using the dispersing agent, and (g) to (i) of FIG. 6 show the results of SEM analysis after dispersing them using the dispersing agent, suggesting that carbon-based materials of graphite, carbon nanotube (MWCNT) and carbon black were more uniformly dispersed in water by using the dispersing agent.

(2) Meanwhile, dispersibility of the dispersing agent of Example 1 was tested using graphene flake as a carbon-based material. However, various solvents such as water, acetone, THF, ethanol and NMP were used to test the dispersibility, and the test results are shown in FIG. 7.

More particularly, the solution which was obtained by dispersing and exfoliating graphite in water using the dispersing agent of Example 1 was centrifuged at 1500 rpm to remove non-exfoliated chunk, and the supernatant was centrifuged at 8000 rpm for 30 minutes. The pellet thus recovered was dried at 55° C. Thereafter, each 10 mg of the dried powder was added to 10 ml of the various solvents such as water, acetone, THF, ethanol and NMP, and then sonicated by batch-type sonication for 1 hour so as to disperse the graphene flakes which were obtained by exfoliating graphite, in various solvents.

Referring to FIG. 7, it was found that when the dispersing agent of Example was used, the carbon-based material of graphene flake can be very uniformly dispersed in various solvents.

(3) Further, the results of testing the dispersion properties of the dispersing agents of Examples 2 to 4 for graphene flake by the above method were observed with SEM analysis or the naked eye, and shown in FIG. 8 (in FIG. 8, 1 h: Example 2, 3.5 h: Example 3, 7 h: Example 4).

First, referring to (d) of FIG. 8, it was found that when the dispersing agents of Examples 2 to 4 were used, the graphene flakes exfoliated from graphite were very uniformly dispersed (see the right of each image; even at 1 year after dispersion, the excellent dispersion state was found to be maintained). Such excellent dispersibility was also confirmed by the SEM analysis results shown in (a) to (c) of FIG. 8.

(4) Additionally, each of the dispersing agents of Example 1 and Comparative Examples 1 and 2 was used to compare and analyze their dispersibility for carbon-based materials by the following method.

First, each 1.0 g of the dispersing agents of Example 1 and Comparative Examples 1 and 2, 50 ml of distilled water and 2.5 g of graphene flake (exfoliated from graphite, as described above) as a carbon-based material were mixed and then sonicated by batch-type sonication for 1 hour so as to disperse the graphene flake which was obtained by exfoliating graphite.

The results of the dispersion are shown in FIG. 9. Referring to FIG. 9, when the dispersing agents of Comparative Example 1 (PNE) and Comparative Example 2 (PNS) were used, graphene flakes were not properly dispersed, and aggregates were found on the vial walls or floating in the water. In contrast, when the dispersing agent of Example 1 (PAO) was used, graphene flakes as the carbon-based material were uniformly dispersed. Therefore, it was confirmed that the dispersing agent of Example 1 shows excellent dispersibility for carbon-based materials.

There is an assumption that unlike the dispersing agents of Comparative Examples 1 and 2 which have individual 1-2 kinds of compounds, the dispersing agent of Example 1 is a mixture of a plurality of polyaromatic hydrocarbon oxides, and the molecular weight range and the content range of the polyaromatic hydrocarbon oxides are optimized, leading to more effective interaction with carbon-based materials and more uniform dispersion of carbon-based materials.

The invention claimed is:

1. A dispersed composition, comprising:
   a dispersing agent, and
   a carbon-based material;
   wherein the dispersing agent comprises a mixture of a plurality of polyaromatic hydrocarbon oxides,
   wherein the mixture includes polyaromatic hydrocarbon oxides having a molecular weight of 300 to 1000 in an amount of 70 to 95% by weight,
   wherein the polyaromatic hydrocarbon oxides have a structure in which one or more oxygen-containing functional groups bind to aromatic hydrocarbons containing 5 to 30 benzene rings,
   wherein an oxygen content is 12 to 50% by weight based on a total element content, when the plurality of polyaromatic hydrocarbon oxides in the mixture are subjected to elemental analysis, and
   wherein the carbon-based materials are one or more selected from the group consisting of graphene, carbon nanotube, graphite, carbon black, a fullerene-based material and a derivative thereof,
   wherein the oxygen-containing functional group includes one or more selected from the group consisting of a hydroxyl group, an epoxy group, a carboxyl group, a nitro group and a sulfonic group.

2. The dispersed composition of claim 1, wherein the aromatic hydrocarbon has 7 to 20 benzene rings in its structure.

3. A preparation method of the dispersed composition of claim 1, comprising oxidizing a mixture of polyaromatic hydrocarbons having a molecular weight of 200 to 1500 in the presence of an oxidizing agent,
   forming a dispersing agent,
   dispersing the dispersing agent in a solvent,
   adding a carbon-based material, and
   forming the dispersed composition of claim 1,
   wherein the oxidizing agent includes one or more selected from the group consisting of nitric acid ($HNO_3$), sulfuric acid ($H_2SO_4$), hydrogen peroxide ($H_2O_2$), ammonium cerium (IV) sulfate (($NH_4)_4Ce(SO_4)_4$) and ammonium cerium (IV) nitrate (($NH_4)_2Ce(NO_3)_6$).

4. The method of claim 3, wherein the mixture of polyaromatic hydrocarbonshaving a molecular weight of 200 to 1500 includes a plurality of aromatic hydrocarbons containing 5 to 50 benzene rings.

5. The method of claim 3, wherein the oxidation step is performed in an aqueous solvent at a reaction temperature of 10 to 90° C. for 0.5 to 20 hours.

6. The method of claim 3, wherein the mixture of polyaromatic hydrocarbons having a molecular weight of 200 to 1500 is derived from pitch obtained from fossil fuels or products thereof.

7. The method of claim 3, further comprising purifying a resultant after the oxidation step so as to obtain a mixture of a plurality of polyaromatic hydrocarbon oxides.

8. The method of claim 7, wherein the purifying includes centrifuging the resultant of the oxidation step.

* * * * *